(12) United States Patent
Funahara

(10) Patent No.: US 7,578,329 B2
(45) Date of Patent: Aug. 25, 2009

(54) TIRE FOR MOTORCYCLE

(75) Inventor: Kiyoshi Funahara, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 421 days.

(21) Appl. No.: 11/509,040

(22) Filed: Aug. 24, 2006

(65) Prior Publication Data
US 2007/0079917 A1    Apr. 12, 2007

(30) Foreign Application Priority Data
Oct. 6, 2005    (JP) .............................. 2005-293700

(51) Int. Cl.
*B60C 15/06* (2006.01)
*B60C 15/00* (2006.01)

(52) U.S. Cl. ................... 152/541; 152/546; 152/554

(58) Field of Classification Search ........... 152/541, 152/546, 554
See application file for complete search history.

(56) References Cited

U.S. PATENT DOCUMENTS
5,429,169 A    7/1995    Igarashi et al.

FOREIGN PATENT DOCUMENTS
EP    0 620 131 A1    10/1994
JP    6-219107 A    8/1994

*Primary Examiner*—Adrienne C Johnstone
(74) *Attorney, Agent, or Firm*—Birch, Stewart Kolasch & Birch, LLP

(57) ABSTRACT

A tire 2 comprises a tread 4, a sidewall 6, a bead 8, and a carcass 10. The bead 8 includes a core 20 and an apex 22 which extends outward in a radial direction from the core 20. The apex 22 has an outer layer 24 and an inner layer 26 which is located to the inside of the outer layer 24 in the axial direction. A hardness of the outer layer 24 is greater than that of the inner layer 26. A difference of the hardness between the outer layer 24 and the inner layer 26 is 15 or greater and 30 or less. A ratio of a thickness of the inner layer 26 to that of the apex 22 is 40% or greater and 60% or less. A ratio of a height HA in the radial direction of the apex 22 to a height HS in the radial direction from a bead base line to an end of the tread 4 is 40% or greater and 60% or less.

6 Claims, 4 Drawing Sheets

TIRE FOR MOTORCYCLE

This application claims priority on Patent Application No. 2005-293700 filed in JAPAN on Oct. 6, 2005, the entire contents of which are hereby incorporated by reference.

BACKGROUND OF THE INVENTION

1. Field of the Invention

The present invention relates to a tire for a motorcycle.

2. Description of the Related Art

Since the motorway network has been improved, vehicles can drive fast and long. Performance of the vehicles has also been improved remarkably. Tires for the vehicles are required a further progress of the performance.

U.S. Pat. No. 5,429,169(JP-A No. 7-172117) has disclosed a tire which is excellent in handling stability and durability without impairing ride comfort. This tire has an apex having a soft part formed by a soft rubber and a hard part formed by a hard rubber. The hard part is located to the outside of the soft part in a radial direction.

Tires with a high stiffness are excellent in handling stability but inferior in ride comfort. Tires with a low stiffness are excellent in ride comfort but inferior in handling stability. It is difficult to obtain handling stability and ride comfort at the same time. Even the tire in the above-mentioned publication is insufficient in handling stability and ride comfort for a high performance motorcycle.

The object of the present invention is to provide a tire for a motorcycle which is excellent in ride comfort and handling stability.

SUMMARY OF THE INVENTION

A tire for a motorcycle according to the present invention comprises a tread having an outer surface which forms a tread surface, a pair of sidewalls extending almost inward in a radial direction from an end of the tread, a pair of beads extending almost inward in the radial direction from the sidewalls and a carcass laid between the beads on both sides along the insides of the tread and the sidewalls. The bead includes a core and an apex extending outward in the radial direction from the core. The apex has an outer layer and an inner layer which is located to the inside of the outer layer in an axial direction. A hardness of the outer layer is greater than that of the inner layer. A difference of the hardness between the outer layer and the inner layer is 15 or greater and 30 or less. A ratio of a thickness of the inner layer to that of the apex is 40% or greater and 60% or less. A ratio of a height HA in the radial direction of the apex to a height HS in the radial direction from a bead base line to an end of the tread is 40% or greater and 60% or less.

It is preferable that said carcass has a carcass ply in this tire. The carcass ply is turned up from the inside to the outside in the axial direction around said core. A ratio of a height HC in the radial direction from an upper end of said apex to an end of the turned-up carcass ply to said height HS in the radial direction is 5% or greater and 15% or less.

In this tire, a ratio of the thickness of the inner layer to that of the outer layer and a difference of the hardness between the outer layer and the inner layer are optimized. In the tire having the outer layer and the inner layer, shock absorption is not impaired. This tire has a high stiffness. The tire is excellent in ride comfort and handling stability.

DESCRIPTION OF THE PREFERRED EMBODIMENTS

The present invention will be described below in detail based on preferred embodiments with reference to the drawings.

Figure 1:
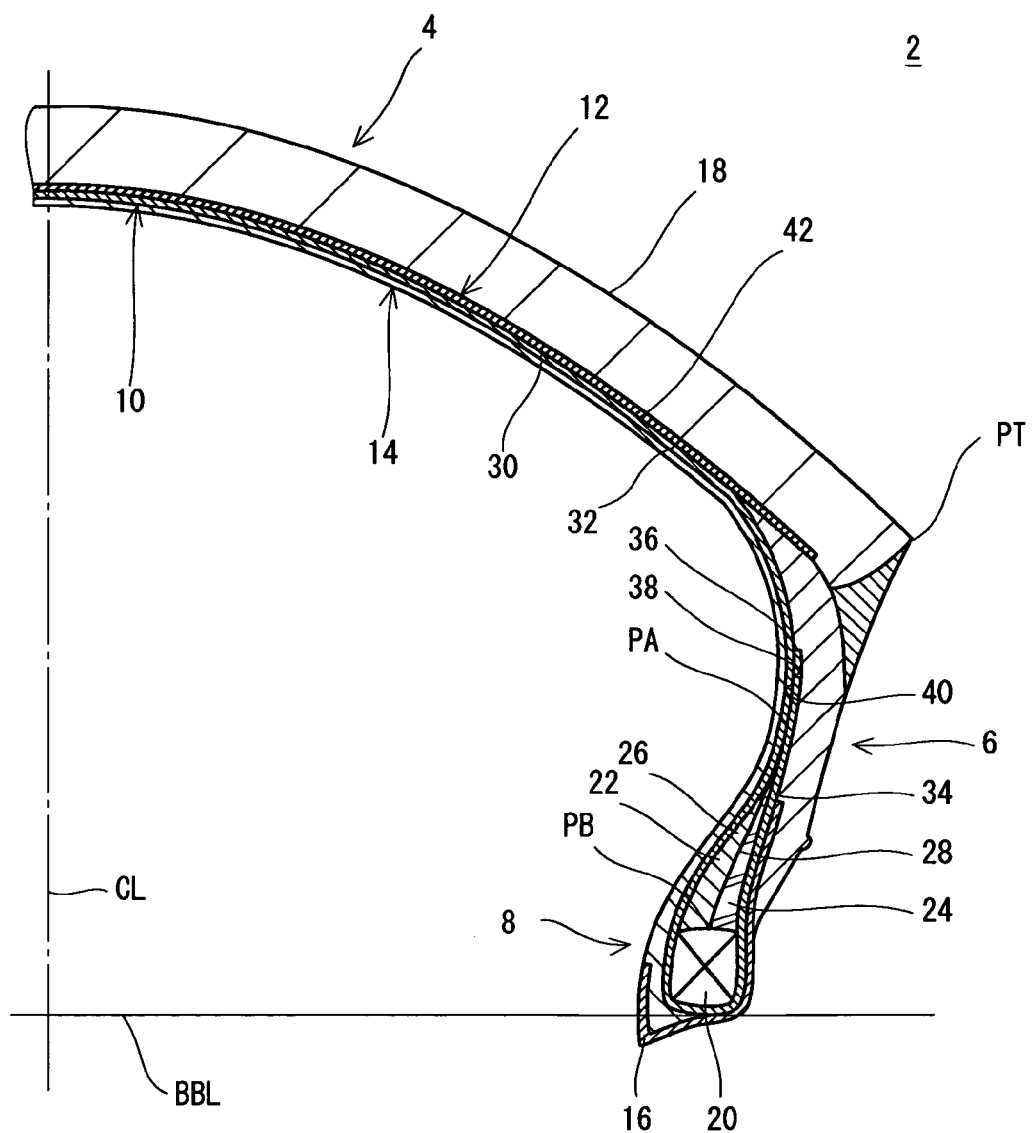
FIG. 1 is a sectional view showing a part of a tire for a motorcycle according to an embodiment of the present invention.

A tire 2 for a motorcycle shown in FIG. 1 has an almost symmetrical shape about a one-dotted chain line CL in FIG. 1. The one-dotted chain line CL shows an equator plane of the tire 2. The tire 2 comprises a tread 4, a sidewall 6, a bead 8, a carcass 10, a belt 12, an inner liner 14 and a chafer 16. The tire 2 is a tubeless pneumatic tire. A solid line BBL is a bead base line. A point PT shows an end of the tread 4. In FIG. 1, a vertical direction is a radial direction of the tire 2. A traverse direction is an axial direction of the tire 2. A vertical direction to the page is a circumferential direction of the tire 2.

The tread 4 is formed by a crosslinked rubber. The tread 4 has an outward convex shape in the radial direction. The tread 4 forms a tread surface 18 to come in contact with a road surface. By carving grooves on the tread surface 18, a tread pattern may be formed.

The sidewall 6 extends almost inward in the radial direction from the end PT of the tread 4. The sidewall 6 is formed by a crosslinked rubber. The sidewall 6 bends to absorb a shock from the road surface. Further, the sidewall 6 prevents the external damage to the carcass 10.

The bead 8 extends almost inward in the radial direction from the sidewall 6. The bead 8 includes a core 20 and an apex 22 which extends outward in the radial direction from the core 20. The core 20 is ring-shaped. The core 20 includes a plurality of non-extensible wires (typically, steel wires). The apex 22 is tapered toward the outside in the radial direction. The apex 22 is formed by a crosslinked rubber. A point PA in FIG. 1 shows an upper end of the apex 22.

As described later, the apex 22 has an outer layer 24 and an inner layer 26 which is located to the inside of the outer layer 24 in the axial direction. In the tire 2, the outer layer 24 and the inner layer 26 are adjacent to each other. A boundary 28 between the outer layer 24 and the inner layer 26 extends inward in the radial direction from the upper end PA of the apex 22 to the top surface of the core 20. FIG. 1 shows an intersection point of the boundary 28 and the top surface of the core 20 as a point PB.

The carcass 10 is formed by a carcass ply 30. The carcass ply 30 is laid between the beads 8 on both sides along the insides of the tread 4 and the sidewall 6. The carcass ply 30 is turned up around the core 20 from the inside to the outside in the axial direction. The carcass ply 30 has a body 32, a turned-up portion 34 and an end 36 of the tuned-up portion 34. On the outside in the radial direction of the upper end PA of the apex 22, an outer surface 38 of the body 32 and an inner surface 40 of the turned-up portion 34 overlap each other. In addition, the carcass 10 may include two carcass plies 30. In this case, both of the carcass plies 30 or one of the two carcass plies 30 is turned up around the core 20 from the inside to the outside in the axial direction.

The carcass ply 30 includes a carcass cord and a topping rubber which are not shown. The absolute value of an angle of the carcass cord to the equator plane is usually 65 to 90 degrees. In other words, the tire 2 is a radial tire. The carcass cord is usually formed by an organic fiber. Examples of a preferable organic fiber include a polyester fiber, a nylon fiber, a rayon fiber, a polyethylene naphthalate fiber and an aramid fiber.

The inner liner 14 is bonded to the inner surface 40 of the carcass 10. The inner liner 14 is formed by a crosslinked rubber. A rubber with a low air permeability is used for the inner liner 14. The inner liner 14 plays a part in holding the internal pressure of the tire 2.

The chafer 16 is located in the vicinity of the bead 8. When the tire 2 is fitted to a rim, the chafer 16 abuts on the rim. By the abutment, the vicinity of the bead 8 is protected. The chafer 16 is usually formed by a cloth and a rubber impregnated into the cloth. It is also possible to use the chafer 16 formed only by a rubber.

The belt 12 is located to the outside of the carcass 10 in the radial direction. The belt 12 is layered on the carcass 10 along the inside of the tread 4. The belt 12 reinforces the carcass 10. The belt 12 is formed by a belt ply 42. Two or more belt plies 42 may be used for the belt 12.

Figure 2:
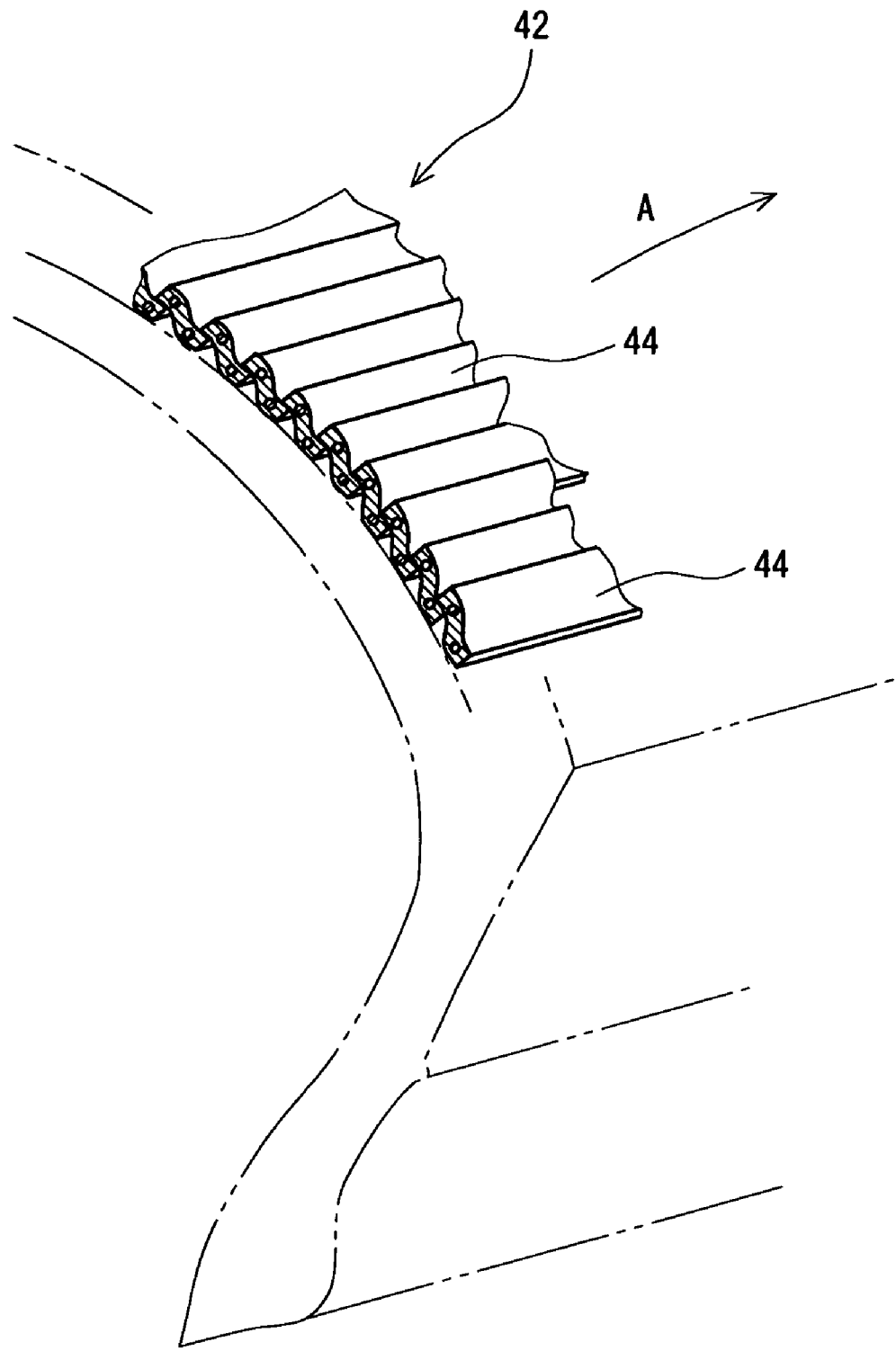
FIG. 2 is a sectional perspective view showing a belt ply before vulcanization.

FIG. 2 is a sectional perspective view showing a belt ply 42 before vulcanization. In FIG. 2, an arrowhead A shows a circumferential direction of the tire 2. The belt ply 42 is formed by a long ribbon 44 which is wound spirally in the circumferential direction on the outside of the carcass 10 in the radial direction. The absolute value of an angle of the ribbon 44 to the equator plane is equal to or less than 5 degrees. In the present specification, the structure of the belt 12 formed by the ribbon 44 which is wound in the circumferential direction is referred to as a Pointless structure.

Figure 3:
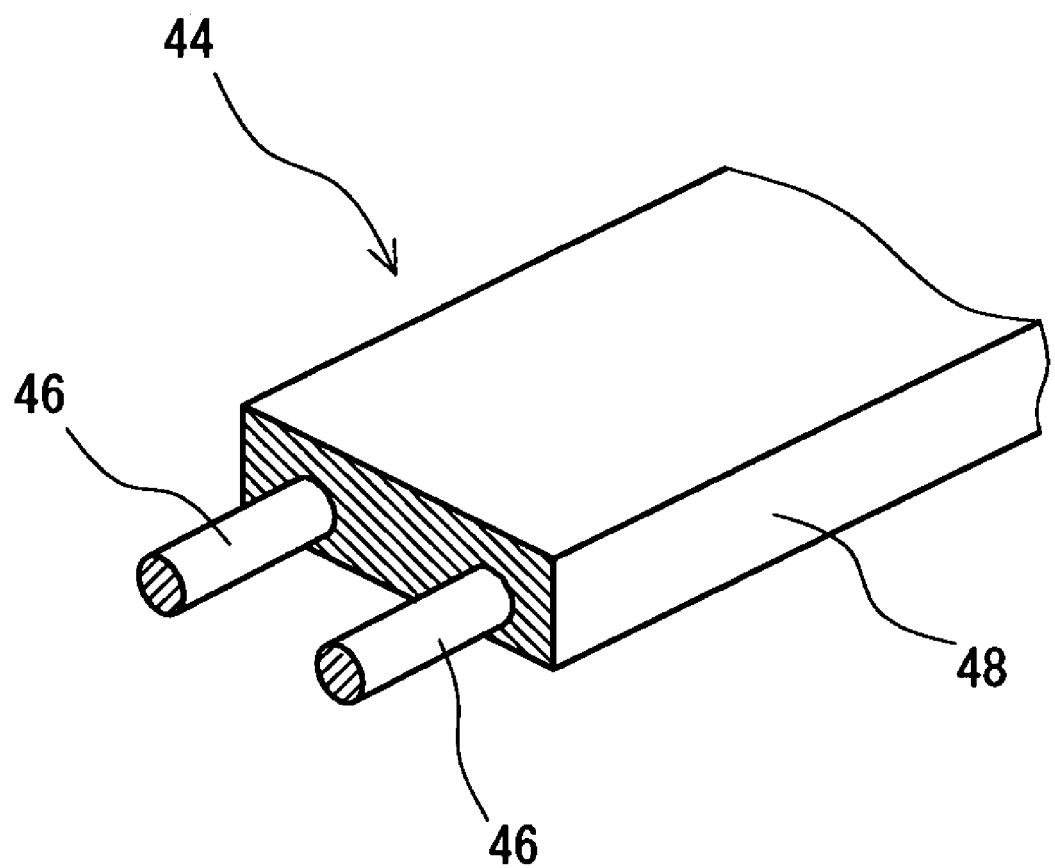
FIG. 3 is an enlarged sectional perspective view showing a band in the belt ply of FIG. 2.

FIG. 3 is an enlarged sectional perspective view showing the ribbon 44 in the belt ply 42 of FIG. 2. As FIG. 3 shows, the ribbon 44 includes two parallel belt codes 46 and a topping rubber 48. The belt code 46 is buried in the topping rubber 48. The belt code 46 extends in a longitudinal direction of the ribbon 44. As mentioned above, the ribbon 44 is wound spirally in the circumferential direction and the belt code 46 is accordingly wound spirally in the circumferential direction. In other words, the belt code 46 is also jointless. The absolute value of an angle of the belt code 46 to the equator plane is equal to or less than 5 degrees. The belt code 46 fixes the carcass 10 uniformly by being wound spirally. The number of the belt codes 46 in the ribbon 44 may be one and may also be three or more. As FIG. 2 shows, a part of the ribbon 44 preferably overlaps the adjacent ribbon 44 when being wound in circumferential direction. By this means, the position of the belt ply 42 is securely prevented from moving. The belt code 46 is formed by an organic fiber or steel. Examples of a preferable organic fiber include a nylon fiber, a rayon fiber, an aramid fiber, a polyethylene naphthalate fiber and a polyester fiber.

Figure 4:
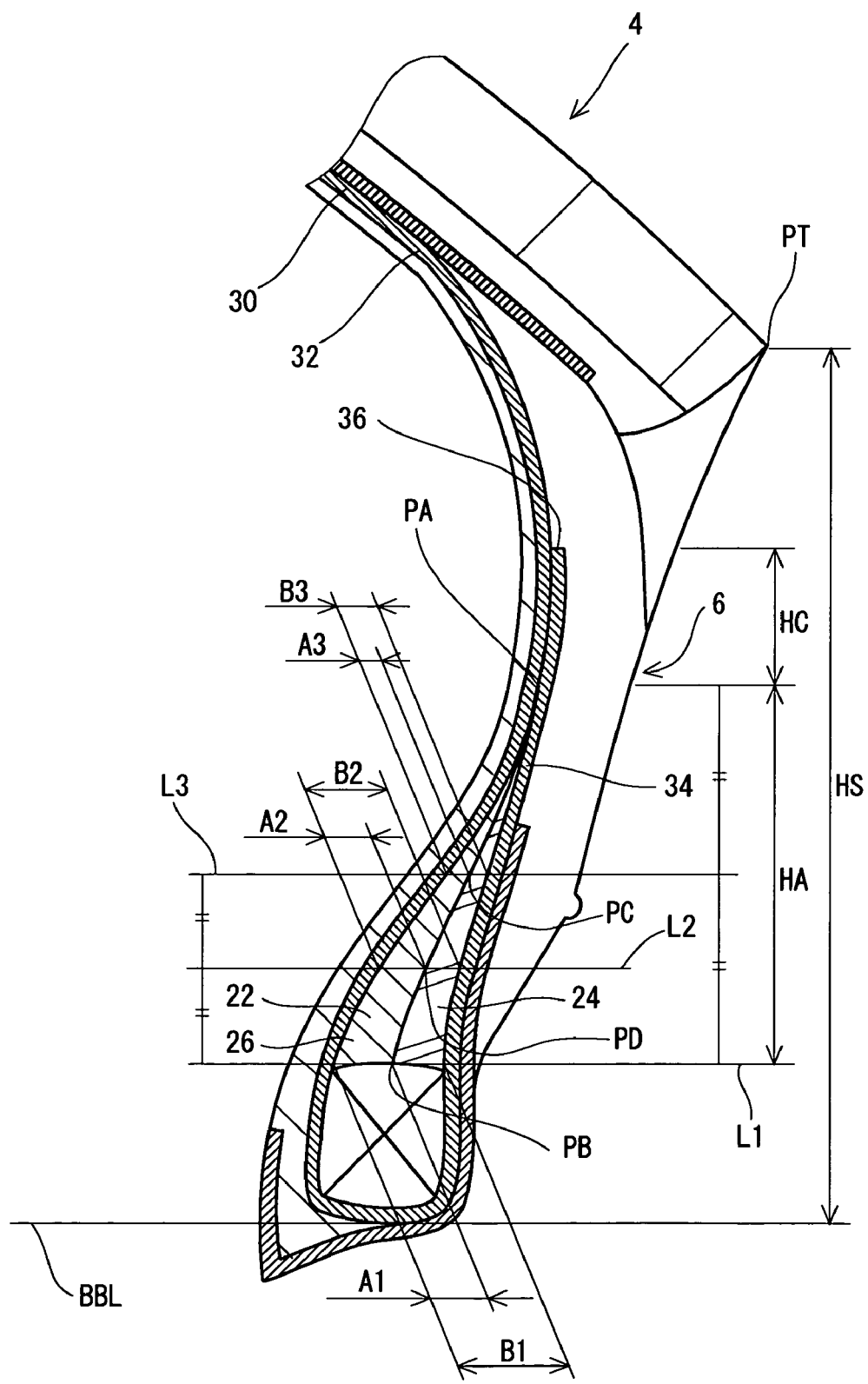
FIG. 4 is a partially enlarged sectional view of the tire of FIG. 1.

FIG. 4 is a partially enlarged sectional view of the tire 2 of FIG. 1. As mentioned above, the tire 2 has the apex 22 having the outer layer 24 and the inner layer 26 locating to the inside of the outer layer 24 in the axial direction. A hardness of the outer layer 24 is greater than that of the inner layer 26. In the tire 2 having the outer layer 24 and the inner layer 26 being lined in the axial direction, shock absorption is not impaired. The tire 2 having the outer layer 24 and the inner layer 26 has a high stiffness. The tire 2 is excellent in ride comfort and handling stability.

In the tire 2, a difference of the hardness between the outer layer 24 and the inner layer is 15 or greater and 30 or less. In the tire 2 with the difference of the hardness being set to be equal to or greater than 15, shock absorption is not impaired. The tire 2 has a high stiffness. The tire 2 is excellent in ride comfort and handling stability. In this respect, the difference of the hardness is preferably equal to or greater than 17 and particularly preferably equal to or greater than 20. The tire 2 with the difference of the hardness being set to be equal to or less than 30 is excellent in durability. In this respect, the difference of the hardness is preferably equal to or less than 28 and particularly preferably equal to or less than 25.

In the tire 2, the hardness of the outer layer 24 is preferably 80 or greater and 95 or less. By setting the hardness of the outer layer 24 to be equal to or greater than 80, the outer layer 24 contributes to stiffness of the tire 2. The tire 2 is excellent in handling stability. In this respect, the hardness is preferably equal to or greater than 83 and particularly preferably equal to or greater than 85. By setting the hardness to be equal to or less than 95, shock absorption is maintained. The tire 2 is excellent in ride comfort. In this respect, the hardness is preferably equal to or less than 92 and particularly preferably equal to or less than 90.

In the tire 2, a hardness of the inner layer 26 is preferably 65 or greater and 80 or less. By setting the hardness of the inner layer 26 to be equal to or greater than 65, the inner layer 26 contributes to stiffness of the tire 2. The tire 2 is excellent in handling stability. In this respect, the hardness is preferably equal to or greater than 68 and particularly preferably equal to or greater than 70. By setting the hardness to be equal to or less than 80, shock absorption is maintained. The tire 2 is excellent in ride comfort. In this respect, the hardness is preferably equal to or less than 77 and particularly preferably equal to or less than 75.

In the present invention, the hardness is measured with a durometer of type A conforming to JIS-K6253. In the measurement of the hardness, three pieces of sheet-like test specimens are used in piles. Each of the test specimens is cut out from the tire 2 and has a thickness of 1.0 mm. The hardness is measured under the condition of 25° C. In addition, test specimens used for the measurement may be formed by crosslinking a rubber composition. In this case, the specimens can be obtained by keeping a rubber composition for 10 minutes in a mold where the temperature is 160° C.

In FIG. 4, what is indicated by a both-sided arrowhead HS is a height in the radial direction from the bead base line BBL to the end PT of the tread 4. What is indicated by a both-sided arrowhead HA is a height in the radial direction from the intersection point PB to the upper end PA of the apex 22. The height HA in the radial direction is the height of the apex 22. What is indicated by a both-sided arrowhead HC is a height in the radial direction from the upper end PA of the apex 22 to the end 36. A point PC is located at a half of the height HA in the radial direction and on the boundary 28 between the inner layer 26 and the outer layer 24. A point PD is located at a half of the height in the radial direction from the point PB to the point PC and on the boundary 28 between the inner layer 26 and the outer layer 24. A solid line L1 is a line which extends through the point PB. A solid line L2 is a line which extends through the point PD. A solid line L3 is a line which extends through the point PC. The solid lines L1, L2 and L3 are parallel to the bead base line BBL.

What is indicated by a both-sided arrowhead A1 is a thickness of the inner layer 26 on the line L1. What is indicated by a both-sided arrowhead B1 is a thickness of the apex 22 on the line L1. What is indicated by a both-sided arrowhead A2 is a thickness of the inner layer 26 on the line L2. What is indicated by a both-sided arrowhead B2 is a thickness of the apex 22 on the line L2. What is indicated by a both-sided arrowhead A3 is a thickness of the inner layer 26 on the line L3. What is indicated by a both-sided arrowhead B3 is a thickness of the apex 22 on the line L3. In the present specification, a ratio X of the thickness of the inner layer 26 to that of the apex 22 is defined by a mean calculated with a ratio of the thickness A1 to the thickness B1, a ratio of the thickness A2 to the thickness B2 and a ratio of the thickness A3 to the thickness B3. When the ratio X is great, the thickness of the outer layer 24 is thin, but the thickness of the inner layer 26 is thick. In the tire 2, a ratio of the inner layer 26 occupying the apex 22 is great. When the ratio X is small, the thickness of the outer layer 24 is thick, but the thickness of the inner layer 26 is thin. In the tire 2, the ratio of the outer layer 24 occupying in the apex 22 is great.

In the tire 2, the ratio X is 40% or greater and 60% or less. By setting the ratio X to be equal to or greater than 40%, the inner layer 26 contributes to shock absorption. The tire 2 is excellent in ride comfort. In this respect, the ratio X is preferably equal to or greater than 43% and particularly preferably equal to or greater than 45%. By setting the ratio X to be equal to or less than 60%, the outer layer 24 contributes to handling stability. In this respect, the ratio X is preferably equal to or less than 58% and particularly preferably equal to or less than 55%.

In the tire 2, a ratio of the height HA to the height HS is 40% or greater and 60% or less. By setting the ratio to be equal to or greater than 40%, the apex 22 contributes to stiffness of the tire 2. The tire 2 is excellent in handling stability. In this respect, the ratio is preferably equal to or greater than 42% and particularly preferably equal to or greater than 45%. By setting the ratio to be equal to or less than 60%, shock absorption is maintained. The tire 2 is excellent in ride comfort. In this respect, the ratio is preferably equal to or less than 58% and particularly preferably equal to or less than 55%.

In the tire 2, a ratio of the height HC to the height HS is 5% or greater and 15% or less. The tire 2 with the ratio set to be equal to or greater than 5% has a high stiffness. The tire 2 is excellent in handling stability. In this respect, the ratio is preferably equal to or greater than 7% and particularly preferably equal to or greater than 9%. By setting the ratio to be equal to or less than 15%, shock absorption is maintained. The tire 2 is excellent in ride comfort. In this respect, the ratio is preferably equal to or less than 13% and particularly preferably equal to or less than 11%.

When measuring dimensions and angles of the tire 2, the tire 2 is fitted into a normal rim and filled with air to have a normal internal pressure. Under the measurement, a load is not put on the tire 2. In the present specification, the normal rim means a rim provided by a standard system including standards of the tire 2. A "standard rim" in JATMA standards, a "Design Rim" in TRA standards and a "Measuring Rim" in ETRTO standards are included in the normal rim. In the present specification, a normal internal pressure means an internal pressure provided by a standard system including standards of the tire 2. A "maximum air pressure" in the JATMA standards, a "maximum value" described in "TIRE LOAD LIMITS AT VARIOUS COLD INFLATION PRESSURE" in the TRA standards, and "INFLATION PRESSURE" in the ETRTO standards are included in the normal internal pressure.

EXAMPLES

Example 1

A tire for a motorcycle which has the basic structure shown in FIG. 1 and the specification shown in the following table 2 was obtained. The tire has a size of 180/55ZR17. One carcass ply is used for a carcass. In the carcass ply, a carcass cord formed by a nylon fiber is used. The carcass cord has a fineness of 1400 dtex/2. An angle of the carcass cord to the equator plane is 90 degrees. One belt ply is used for a belt. In the belt ply, a belt cord formed by steel is used. An angle of the belt cord to the equator plane is substantially 0 degree. A hardness of an outer layer is 90. A hardness of an inner layer is 70. Accordingly, a difference of the hardness between the outer layer and the inner layer is 20. A ratio X of a thickness of the inner layer to that of an apex is 50%. A ratio of a height HA of the apex in a radial direction to a height HS in the radial direction from a bead base line BBL to an end PT of a tread is 50%. The ratio (HA/HS) shows a value obtained by multiplying 100 after the height HA in the radial direction is divided by the height HS in the radial direction.

Comparative Example 6 and Examples 6 to 12

A tire was obtained in the same manner as in the example 1 except that hardness of the outer layer and the inner layer were set as shown in the following Table 2.

Comparative Example 4 to 5 and 7 to 8, and Examples 5 and 12

A tire was obtained in the same manner as in the example 1 except that the ratio X was set as shown in the following Tables 1, 2 and 3.

Comparative Example 1 to 3

A tire was obtained in the same manner as in the example 1 except that the ratio X and a ratio (HA/HS) were set as shown in the following Table 1.

Comparative Example 9 to 11 and Examples 2 to 4 and 13 to 15

A tire was obtained in the same manner as in the example 1 except that the ratio X and the ratio (HA/HS) were set as shown in the following Tables 1, 2 and 3.

[In-Vehicle Evaluation]

An experimental tire was attached to the rear wheel of a motorcycle with an engine displacement of 600 cm$^3$. A size of a rim is MT 5.50×17. An internal pressure of the tire is 290 kPa. To the front wheel, a conventional tire on the market was attached. A size of the tire for the front wheel is 120/70ZR17. In a carcass of the tire for the front wheel, two carcass plies are used. The carcass ply has a carcass cord formed by a nylon fiber. An angle of the carcass cord to the equator plane is 72 degrees. The cord has a fineness of 940 dtex/2. Two cut plies are used for a belt. In the cut ply, a cord formed by an aramid fiber is used. An angle of the cord to the equator plane is 21 degrees. The cord has a fineness of 1670 dtex/2. A size of a rim is MT3.50×17. An internal pressure of the tire is 250 kPa. At a circuit course constituted by a dry asphalt road, a cornering at a speed of 100 km/h to 150 km/h and a straight running at a speed of 250 km/h to around 280 km/h which is the maximum speed for a motorcycle were carried out. A sensuous evaluation by a driver with 5.0 points as the highest mark was carried out. When a numeric value is greater, the evaluation is more excellent. 3.5 points show an acceptable lower limit. Evaluated items are stiffness feeling and shock absorption. The result is shown in the following Tables 1, 2 and 3.

TABLE 1

Specification of Tire and Result of Evaluation.

|  | Comp. Example 1 | Comp. Example 2 | Comp. Example 3 | Example 2 | Example 3 | Example 4 | Comp. Example 4 | Comp. Example 5 | Example 5 |
|---|---|---|---|---|---|---|---|---|---|
| Hardness of outer layer | 90 | 90 | 90 | 90 | 90 | 90 | 90 | 90 | 90 |
| Hardness of inner layer | 70 | 70 | 70 | 70 | 70 | 70 | — | 70 | 70 |
| Difference of hardnesses | 20 | 20 | 20 | 20 | 20 | 20 | — | 20 | 20 |
| Ratio X (%) | 40 | 50 | 60 | 40 | 50 | 60 | 0 | 25 | 40 |
| HA/HS (%) | 30 | 30 | 30 | 40 | 40 | 40 | 50 | 50 | 50 |
| Stiffness feeling | 2.5 | 3.0 | 3.0 | 4.0 | 4.0 | 3.5 | 4.5 | 4.0 | 4.0 |
| Shock absorption | 4.0 | 4.0 | 4.0 | 3.5 | 4.0 | 4.0 | 3.0 | 3.0 | 3.5 |

TABLE 2

Specification of Tire and Result of Evaluation.

|  | Comp. Example 6 | Example 6 | Example 7 | Example 8 | Example 1 | Example 9 | Example 10 | Example 11 | Example 12 |
|---|---|---|---|---|---|---|---|---|---|
| Hardness of outer layer | 80 | 80 | 85 | 90 | 90 | 90 | 95 | 95 | 90 |
| Hardness of inner layer | 70 | 65 | 70 | 75 | 70 | 65 | 70 | 65 | 70 |
| Difference of hardnesses | 10 | 15 | 15 | 15 | 20 | 25 | 25 | 30 | 20 |
| Ratio X (%) | 50 | 50 | 50 | 50 | 50 | 50 | 50 | 50 | 60 |
| HA/HS (%) | 50 | 50 | 50 | 50 | 50 | 50 | 50 | 50 | 50 |
| Stiffness feeling | 3.5 | 3.5 | 3.5 | 4.0 | 4.0 | 4.0 | 4.0 | 4.0 | 3.5 |
| Shock absorption | 3.0 | 3.5 | 3.5 | 3.5 | 4.0 | 4.0 | 4.0 | 4.0 | 4.0 |

TABLE 3

Specification of Tire and Result of Evaluation.

|  | Comp. Example 7 | Comp. Example 8 | Example 13 | Example 14 | Example 15 | Comp. Example 9 | Comp. Example 10 | Comp. Example 11 |
|---|---|---|---|---|---|---|---|---|
| Hardness of outer layer | 90 | — | 90 | 90 | 90 | 90 | 90 | 90 |
| Hardness of inner layer | 70 | 70 | 70 | 70 | 70 | 70 | 70 | 70 |
| Difference of hardnesses | 20 | — | 20 | 20 | 20 | 20 | 20 | 20 |
| Ratio X (%) | 75 | 100 | 40 | 50 | 60 | 40 | 50 | 60 |
| HA/HS (%) | 50 | 50 | 60 | 60 | 60 | 70 | 70 | 70 |
| Stiffness feeling | 3.0 | 3.0 | 4.0 | 4.0 | 3.5 | 4.0 | 4.0 | 4.0 |
| Shock absorption | 4.0 | 4.5 | 3.5 | 4.0 | 4.0 | 3.0 | 3.0 | 2.5 |

As shown in the Tables 1, 2 and 3, the tire according to each of the examples is not impaired in shock absorption. This tire has a high stiffness. This tire is excellent in ride comfort and handling stability. From the result of the evaluation, the advantages of the present invention are apparent.

The above description is only illustrative and various changes can be made without departing from the scope of the present invention.

What is claimed is:

1. A tire for a motorcycle comprising:
   a tread having an outer surface which forms a tread surface, a pair of sidewalls extending almost inward in a radial direction from an end of the tread, a pair of beads extending almost inward in the radial direction from the sidewalls and a carcass laid between the beads on both sides along the insides of the tread and the sidewalls,
   wherein each bead has a core and an apex extending outward in the radial direction from the core,
   the apex has an outer layer and an inner layer which is located to the inside of the outer layer in the axial direction,
   the outer layer is adjacent to the inner layer and the boundary between the two layers extends inward in the radial direction from the upper end of the apex to the top surface of the bead core,
   a hardness of the outer layer is greater than that of the inner layer,
   a difference of the hardness between the outer layer and the inner layer is 15 or greater and 30 or less,
   a ratio of a thickness of the inner layer to that of the apex is 40% or greater and 60% or less, and
   a ratio of a height HA of the apex in the radial direction to a height HS in the radial direction from a bead base line BBL to an end of the tread is 40% or greater and 60% or less, the ratio of the thickness of the inner layer to that of the apex being defined by a mean calculated with a ratio of a thickness A1 to a thickness B1, a ratio of a thickness A2 to a thickness B2, and a ratio of a thickness A3 to a thickness B3, wherein A1 and B1 are measured along a line L1 parallel to a bead base line and intersecting a point PB on a boundary adjacent to the top surface of the bead core, A2 and B2 are measured along a line L2 parallel to a bead base line and intersecting a point PD on a boundary at a radial height of one quarter of the radial height HA between the point PB and an upper end PA of the apex, and A3 and B3 are measured along a line L3 parallel to a bead base line and intersecting a point PC on a boundary at a radial height HA.

2. The tire according to claim 1, wherein the ratio of the thickness of the inner layer to that of the apex is 45% or greater and 55% or less, and the ratio of the height HA of the apex in the radial direction to the height HS in the radial direction from the bead base line BBL to the end of the tread is 45% or greater and 55% or less.

3. The tire according to claim 1, wherein the carcass has a carcass ply,
said carcass ply is turned up from the inside to the outside in the axial direction around the core,
a ratio of a height HC in the radial direction from the upper end of said apex to an end of the turned-up portion of the carcass ply to said height HS in the radial direction is 5% or greater and 15% or less.

4. The tire according to claim 3, wherein the ratio of the thickness of the inner layer to that of the apex is 45% or greater and 55% or less, and the ratio of the height HA of the apex in the radial direction to the height HS in the radial direction from the bead base line BBL to the end of the tread is 45% or greater and 55% or less.

5. The tire according to claim 3, wherein the ratio of the height HC in the radial direction from the upper end of said apex to the end of the turned-up portion of the carcass ply to said height HS in the radial direction is 9% or greater and 11% or less.

6. The tire according to claim 5, wherein the ratio of the thickness of the inner layer to that of the apex is 45% or greater and 55% or less, and the ratio of the height HA of the apex in the radial direction to the height HS in the radial direction from the bead base line BBL to the end of the tread is 45% or greater and 55% or less.

* * * * *